UNITED STATES PATENT OFFICE.

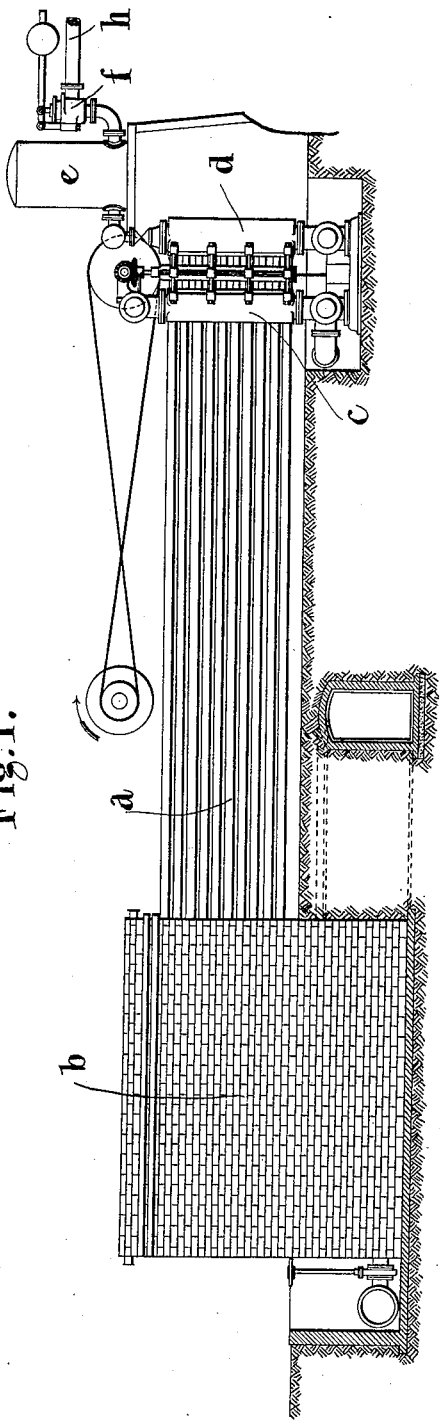

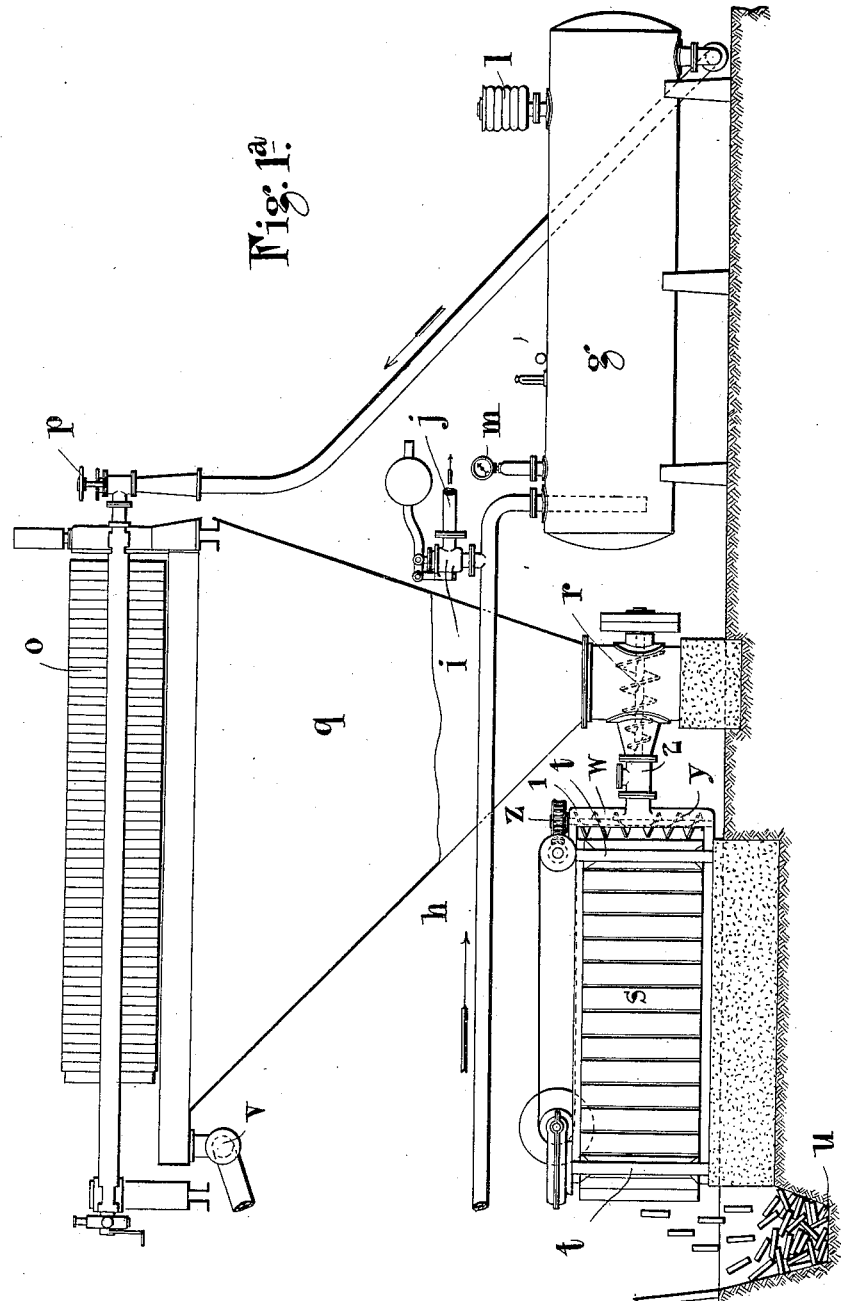

NILS TESTRUP, OF LONDON, AND OLOF SÖDERLUND, OF CLAPHAM PARK, LONDON, ENGLAND, ASSIGNORS, BY MESNE ASSIGNMENTS, TO WETCARBONIZING LIMITED, OF LONDON, ENGLAND.

REMOVAL OF WATER FROM WET CARBONIZED PEAT.

1,094,270.  Specification of Letters Patent.  Patented Apr. 21, 1914.

Application filed December 6, 1911. Serial No. 664,258.

*To all whom it may concern:*

Be it known that we, NILS TESTRUP, a subject of the King of Great Britain and Ireland, and residing at 6 Broad Street Place, in the county of London, England, and OLOF SÖDERLUND, a subject of the King of Sweden, and residing at "Fairlawn," Clarence Road, Clapham Park, in the county of London, England, have invented certain new and useful Improvements Relating to the Removal of Water from Wet Carbonized Peat, of which the following is a specification.

This invention relates to the removal of water from wet carbonized peat.

The term wet carbonized peat employed herein refers to peat treated according to a process such as that proposed by Ekenberg U. S. Patents Nos. 830,311 and 847,748.

The removal of the water from carbonized peat presents difficulties. In ordinary settling tanks a reduction to 92% of water in the peat is the best obtainable. Again, by ordinary filtration only a slight improvement results, the water being reducible only to about 90%.

The object of this invention is to overcome these difficulties, and to provide a practicable process and apparatus allowing of the reduction of the percentage of water to a considerably lower value than that (namely about 70%) obtainable by the means hitherto proposed.

According to this invention, externally applied and preferably slowly applied sustained pressure is used in the removal of the water, this treatment preferably following a preliminary treatment in which a pressure applied internally is used, *i. e.*, a pressure transmitted by the fluid itself. For this purpose, the wet material may be passed into a filter press and the water which is readily expressible therein removed in this way, a further quantity of water being then removed by subjecting the cake to pressure externally applied by a band or like press.

The accompanying drawing shows one form for carrying the invention into effect. In this drawing only the elements necessary to the understanding of the invention are shown, and the drawing is to be regarded as of a diagrammatic nature only.

The peat is carbonized in a carbonizer comprising regenerative heating tubes $a$, a furnace $b$, and inlet and outlet headers $c$ and $d$ respectively. The peat leaves the carbonizer at a high pressure, and enters the air vessel $e$, and passes thence through a pressure regulating valve $f$, to a receiver $g$, the connecting pipe $h$ being provided with a relief valve $i$ and blow off pipe $j$. The peat receiver is provided with a safety valve $l$, pressure gage $m$, and other customary accessories. From this vessel the peat, by virtue of this pressure in the vessel, passes into a filter press $o$, the pressure of the material being used in the press to effect the filtration. A pressure of 100 and 150 lbs. per square inch is preferably employed. As it becomes in most cases necessary to remove the press cakes from the filter press after about 25 minutes' operation at 100 lbs. pressure two or more of these devices are preferably employed, means such as cocks or valves $p$ in connection with suitable pipes being employed to allow of cutting off the supply to one for the purpose of allowing emptying of the same while another is being used.

The material removed from the filter presses is thrown into a common bunker $q$, means such as a screw conveyer $r$ at the bottom of the same conveying the material at any desired rate to a press of the band press type, capable of giving a gradually applied and high pressure by virtue of the fact that the strong perforated endless bands, one of which is shown at $s$, and which are carried on shafts $t$ at either end, are placed closer together at one end than at the other, so that the material entering at one end is gradually more strongly squeezed between the bands as it approaches the other end, and a further quantity of liquid therefore leaves the material, and passes away through the perforations of the links of the bands. As many of these presses as necessary are of course employed. Such a press, although unsuitable for thinly fluid masses, is particularly useful in this case, where a slowly applied high pressure is required, and not an impact which would lead to no substantial expression of water, owing to the elasticity of the mass. The final pressure required may amount to about 600 lbs. to the square inch, and the band press therefore should be of such a nature as to give a very high pressure without undue friction. The pressed material is discharged into a trough $u$, from which it can be taken to any desired locality. The liquid matters leaving the filter press at $v$, as well as those leaving the band press, are either passed away for utilization in any suitable manner, or may be passed to waste, for instance, by passing it back to the peat bog. In order to feed the peat brought by the conveyer $r$ more uniformly into the oblong entrance to the band press, a double screw $w$ and $y$, driven from worm gear $z$, is mounted across the entrance to the press, so that the material entering the chamber 1 in which the double screw is mounted by the tube 2 is partly taken by the double screw, and distributed toward each end of the press entrance.

It will thus be seen that while in the first stage (in the filter press) filtration is brought about by keeping up the pressure by pumping more fluid into a chamber of constant volume, in the second stage (in the band press) the size of the confining chamber is reduced as the water is extracted. The material as it now leaves the press containing about 50% water is quite solid and is suitable for direct use in a producer for conversion into gaseous fuel, preferably in an ammonia recovery gas producer for which it is particularly suitable. On the other hand, the material may be passed into any ordinary briqueting plant such as a lignite plant for conversion into briquet fuel.

Having now described our invention what we claim as new and desire to secure by Letters Patent is:—

1. A method of removing water from wet carbonized peat, consisting in subjecting the material to filter pressing, and thereafter to slowly applied external pressure.

2. A method of removing water from wet carbonized peat pulp, consisting in subjecting the pulp to filter pressing, until its water content is reduced to about 70 per cent., and thereafter subjecting the resulting solid to a gradually increasing external pressure, until the water content has been reduced to about 50 per cent.

In testimony whereof we have signed our names to this specification in the presence of the subscribing witnesses.

NILS TESTRUP.
OLOF SÖDERLUND.

Witnesses to the signature of Nils Testrup:
BERTRAM H. MATTHEWS,
E. C. WALKER.

Witnesses to the signature of Olof Söderlund:
BERTRAM H. MATTHEWS,
J. S. CRAWLEY.

Copies of this patent may be obtained for five cents each, by addressing the "Commissioner of Patents, Washington, D. C."